US011575613B2

(12) United States Patent
Barnes et al.

(10) Patent No.: US 11,575,613 B2
(45) Date of Patent: *Feb. 7, 2023

(54) MANAGING DATA TRAFFIC ACCORDING TO DATA STREAM ANALYSIS

(71) Applicant: KYNDRYL, INC., New York, NY (US)

(72) Inventors: Andrew P. Barnes, Greystones (IE); John V. Delaney, Kildalkey (IE); Anthony M. Hunt, Hopewell Junction, NY (US); Claus Schrøder-Hansen, Copenhagen (DK); Clea A. Zolotow, Key West, FL (US)

(73) Assignee: Kyndryl, Inc., New York, NY (US)

( * ) Notice: Subject to any disclaimer, the term of this patent is extended or adjusted under 35 U.S.C. 154(b) by 315 days.

This patent is subject to a terminal disclaimer.

(21) Appl. No.: 16/386,316

(22) Filed: Apr. 17, 2019

(65) Prior Publication Data
US 2019/0245797 A1 Aug. 8, 2019

Related U.S. Application Data

(63) Continuation of application No. 15/162,751, filed on May 24, 2016, now Pat. No. 10,320,689.

(51) Int. Cl.
*H04L 47/283* (2022.01)
*H04L 69/16* (2022.01)
(Continued)

(52) U.S. Cl.
CPC .......... *H04L 47/283* (2013.01); *H04L 47/27* (2013.01); *H04L 67/04* (2013.01); *H04L 67/61* (2022.05); *H04L 69/16* (2013.01); *H04L 69/22* (2013.01)

(58) Field of Classification Search
CPC ....... H04L 47/283; H04L 47/27; H04L 67/04; H04L 67/322; H04L 69/16; H04L 69/22
See application file for complete search history.

(56) References Cited

U.S. PATENT DOCUMENTS 6,697,383 B1 * 2/2004 Li ........................... H04L 12/12
370/510
8,638,793 B1 1/2014 Ben-Mayor
(Continued)

FOREIGN PATENT DOCUMENTS

| EP | 1191764 A1 | 3/2002 |
|---|---|---|
| WO | 2004057817 A2 | 12/2004 |
| WO | 2005109401 A1 | 11/2005 |

OTHER PUBLICATIONS

"IP routing utilities", Developer, Iproute2 utilities, Captured Jul. 9, 2004, Printed on Feb. 5, 2016, 1 page, <http://web.archive.org/web/20040709080613/http://www.developer.osdl.org/dev/iproute2/>.
(Continued)

*Primary Examiner* — Samina F Choudhry
(74) *Attorney, Agent, or Firm* — John Kennel; Andrew M. Calderon; Calderon Safran & Cole, P.C.

(57) ABSTRACT

Data migrations are not able to be identified or traced through a switched network to their originating hub, because the corresponding TCP/IP data stream goes through a plurality of optimized differential switches and the originating IP in the packet header gets replaced at each switch. The present invention provides a mechanism to introduce a lag or a jitter into the IP to label the migrated data. The labeled data are able to be traced and identified through multiple managed hubs and/or switches.

20 Claims, 3 Drawing Sheets

(51) Int. Cl.
*H04L 47/27* (2022.01)
*H04L 67/04* (2022.01)
*H04L 69/22* (2022.01)
*H04L 67/61* (2022.01)

(56) References Cited

U.S. PATENT DOCUMENTS

| | | | |
|---|---|---|---|
| 9,009,332 B1 | 4/2015 | Remizov | |
| 2004/0049596 A1 | 3/2004 | Schuehler | |
| 2005/0094557 A1 | 5/2005 | Chen | |
| 2007/0081471 A1* | 4/2007 | Talley, Jr. | H04L 43/18 370/252 |
| 2009/0245111 A1* | 10/2009 | Waltermann | H04L 67/1097 370/236 |
| 2010/0103830 A1 | 4/2010 | Salgado | |
| 2011/0019556 A1 | 1/2011 | Hsin | |
| 2014/0143308 A1 | 5/2014 | Tychina | |
| 2014/0237134 A1* | 8/2014 | Branson | H04L 65/60 709/231 |
| 2015/0256433 A1* | 9/2015 | Sum | G01R 21/00 709/224 |
| 2015/0263959 A1 | 9/2015 | Patwardhan | |
| 2017/0346751 A1 | 11/2017 | Barnes | |

OTHER PUBLICATIONS

"Quality of Service Networking", Doc Wiki, Cisco, last modified on Oct. 16, 2012, at 21:11, 29 pages, <http://docwiki.cisco.com/wiki/Quality_of_Service_Networking#Congestion_Management>.

"TCP Windows Sizes", NASA Research and Engineering Network (NREN), Last Updated: Mar. 23, 2007, Printed on Feb. 5, 2016, 2 pages, <http://www.nren.nasa.gov/tcpwindows.html>.

Morita et al., "Designing a Delay-based Adaptive Congestion Control Mechanism using Control Theory and System Identification for TCP/IP Networks", Proceedings of SPIE, vol. 4865(2002), © 2002 SPIE, pp. 132-143.

Valter, "What is Jitter in Networking?", How Does Internet Work, May 3, 2013, 6 pages, <http://howdoesinternetwork.com/2013/jitter>.

Webjosh, "Does a typical router modify the L2 header (MAC address)?", IT Knowledge Exchange, Last updated: Jan. 24, 2007, 10 pages, <http://itknowledgeexchange.techtarget.com/itanswers/does-a-typical-router-modify-the-l2-header-mac-address/>, printed Feb. 5, 2016.

Zolotow et al., "Utilizing Linux for OC Distance Emulation or SAN to SAN Testing", Computer Measurement Group (CMG), 2013, Last modified Apr. 15, 2014 02:05, 14 pages, <www.cmg.org/wp-content/uploads/2013/05/m_99_7.pdf>.

List of IBM Patents or Patent Applications Treated as Related, Filed Apr. 17, 2019, 2 pages.

* cited by examiner

MANAGING DATA TRAFFIC ACCORDING TO DATA STREAM ANALYSIS

BACKGROUND

The present invention relates generally to the field of networking technology, and more particularly to data traffic.

Networking technology generally involves design and use of a network, including hardware such as cables, hubs, bridges, switches, and routers; telecommunication protocols such as TCP/IP (Transmission Control Protocol/Internet Protocol); and computer software for using and managing the network. Network is usually categorized as local area network, wide area network and Internet.

One of challenges a network faces is data traffic controlling or bandwidth management. Data traffic control refers to a process of managing, controlling and/or reducing network traffic, especially Internet bandwidth, which is used to reduce congestion, latency and packet loss.

SUMMARY

In one aspect of the present invention, a method is provided comprising: introducing a first pattern of data transmission performance variance into a first TCP/IP data stream of a specified type of data traffic transmitted over a network; receiving a second TCP/IP data stream over the network; detecting a second pattern of data transmission performance variance in the second TCP/IP data stream; generating a comparison of the second pattern to the first pattern; identifying a data traffic type of the second TCP/IP data stream based on the comparison; and filtering the second TCP/IP data stream based on the data traffic type.

According to an aspect of the present invention, there is a method, computer program product and/or system that performs the following operations (not necessarily in the following order): (i) receiving an expected pattern data set including information indicative of data transmission performance variance in a networking traffic data stream; (ii) receiving a plurality of networking traffic data streams, where each networking traffic data stream includes a pattern of data transmission performance variance; (iii) for each networking traffic data stream of the plurality of networking traffic data streams, comparing the pattern of data transmission performance variance against the expected pattern data set; (iv) determining a subset of one or more networking traffic data stream(s) based, at least in part, on the comparison of patterns of data transmission performance variance against the expected pattern data set; and (v) filtering the subset of one or more networking traffic data stream(s).

DETAILED DESCRIPTION

Figure 1:
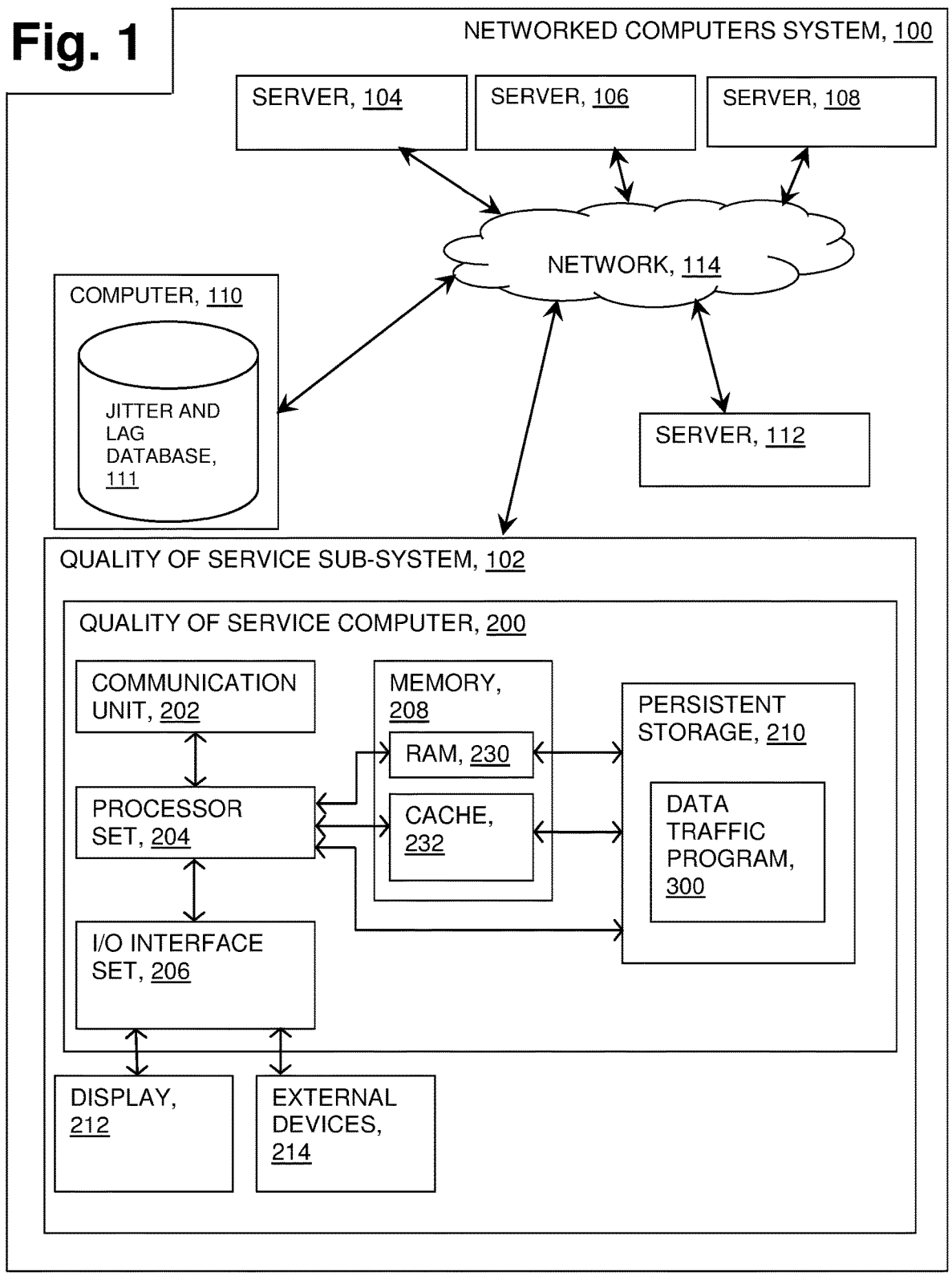
FIG. 1 is a schematic view of a first embodiment of a system according to the present invention.

A method is provided for identifying data traffic for a managed networking circuit that transmits a specified data type. The data traffic for the managed networking circuit is identified by introducing a preferred pattern of data transmission lag or jitter into TCP/IP (Transmission Control Protocol/Internet Protocol) data stream of the data traffic. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions, or acts, or carry out combinations of special purpose hardware and computer instructions.

The present invention will now be described in detail with reference to the Figures. FIG. 1 is a functional block diagram illustrating various portions of networked computers system 100, in accordance with one embodiment of the present invention, including: quality of service (QoS) sub-system 102; server sub-systems 104, 106, 108, 112; computer 110, jitter and lag database 111, communication network 114; quality of service computer 200; communication unit 202; processor set 204; input/output (I/O) interface set 206; memory device 208; persistent storage device 210; display device 212; external device set 214; random access memory (RAM) devices 230; cache memory device 232; and data traffic program 300.

Servers sub-systems 104, 106, 108, 112 and computer 110 may be a laptop computer, tablet computer, netbook computer, personal computer (PC), a desktop computer, a personal digital assistant (PDA), a smart phone, or any programmable electronic device capable of communicating with the application management sub-systems 102 via network 114.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage, and control certain software functions that will be discussed in detail below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Alternatively, a portion of program 300 may be stored in server sub-systems 104, 106, 108, 112, and computer 110. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either, or both, physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Program 300 operates to define a preferred pattern of lag or jitter for TCP/IP data transmission and to introduce the preferred pattern into a TCP/IP data stream to mark the corresponding data type transmitted over a network. Further, program 300 detects a pattern of TCP/IP data stream to compare the pattern with the preferred pattern, such that the data traffic associated with the preferred pattern of lag or jitter can be identified and allowed through the network correspondingly.

Some embodiments of the present invention recognize the following facts, potential problems and/or potential areas for improvement with respect to the current state of the art: (i) data traffic cannot be traced through a switched network to their originating hubs; (ii) the originating IP in a packet header gets replaced at each switch of a plurality of switches; and/or (iii) production traffic is not able to be differentiated from streaming music or videos.

During data center migrations, it is common to send data over a local area network (LAN) and through multiple hubs and switches. The TCP/IP data stream of migration traffic goes through variable optimized differential switches and the originating IP in the packet header gets replaced at each switch. Thus, data migration traffic cannot be identified or traced through the switched network to their originating hub. During this time migration traffic looks like streaming video or audio.

Quality of services (QoS) software and/or appliances are commonly used in datacenter networking to ensure that production traffic (e.g., data migration traffic) flows easily through the network components. Oftentimes, corporations have turned off streaming (such as music or videos) via their QoS system in order to ensure that already congested networks can function effectively. However, when doing a data migration, the migration traffic looks like streaming music or videos so the QoS system will cut down the available bandwidth for data migration as well as other types of streaming traffic.

Some embodiments of the present invention provide a mechanism to recognize the difference between types of data traffic, such as a streaming migration workload and a streaming music and/or videos workload for the QoS system in order to maximize the traffic throughput while restricting specific types of data traffic. The mechanism may be performed via either the TCP/IP sliding window or by introducing jitter at the OS (operation system) level via commands (such as the netem command). Specifically, either a lag or a jitter is introduced into the IP through the sliding window scale of the TCP/IP address header at the switch in order to trace the packet through multiple managed hubs/switches by identifying the pattern of the lag or jitter. Alternatively, a time delay is added to data packets being transmitted in the TCP/IP data stream. Herein lag is a noticeable delay between the time a data packet is initiated and the time when the data packet starts transmitting over the network. In networking latency generally is referred to as the ping time: the amount of time it takes for a packet to travel from point A to point B, or to travel there and back again. High packet latency generally leads to lag. A jitter, as used herein, is a variance in latency over time. If every packet takes exactly the same amount of time to travel from A to B, there is no jitter. If the packet delivery times are inconsistent, jitter then occurs. Namely, a jitter is caused by time difference in packet interarrival times.

TCP has a sliding window that limits the transmission speed in order to reduce congestion and data loss. This is a variable-duration window that allows the transmitting end-host to send a specified number of data units before an acknowledgement is received. The TCP window contains the amount of outstanding data a transmitting end-host can send on a particular connection before it gets acknowledgment back from the receiving end-host.

The window size of TCP/IP is configurable, or tunable. To efficiently use a network link, a larger window size is preferred to improve TCP performance in networks with large bandwidth or long-delay characteristics. The relationship of bandwidth and delay for a network is characterized by the bandwidth delay product (BDP) that is the quantity of data that can be in transit on a network at a given time. For a network, BDP=B/W×RTT, where B/W is the peak bandwidth of the link (based upon the slowest link in the path) and RTT is the round-trip delay which can be measured with the ping command. The TCP window size for the network can be calculated using: window size/RTT=effective bandwidth. For example, based on the transmitting end-system buffers, the TCP/IP window size is assumed to be set at 64 kilobytes (kb) and the RTT is 50 milliseconds. Then the effective bandwidth (i.e., the maximum data transfer rate) would be 10.4 Mbps (64 kilobytes/50 milliseconds=10.4 Mbps). However, if the slowest link (peak bandwidth) in the path transfers at 1 gigabit per second (Gbps), then, based on the transmitting host configuration, data would only be transferred about 1 percent of the time, and would utilize only about 1 percent (about 10.4 Mbps/1 Gbps) of the available bandwidth. In this example, a 6100-kb (6.1 megabyte) window size would be required to efficiently utilize the 1-Gbps link: 6100 kilobytes/50 milliseconds=999.4 Mbps (0.999 Gbps). In some embodiments of the present invention, the effective bandwidth is modified as a preferred bandwith so the QoS system would recognize the traffic associated with the bandwidth. Namely, the TCP/IP sliding window size is modified to introduce a lag pattern into the TCP/IP data stream, for example, making a data packet unusual by introducing a 100 ms delay between packets being transmitted.

Some embodiments of the present invention modify the TCP/IP sliding window to introduce a jitter pattern into the TCP/IP data stream. Jitter can be overcome with buffering, but that adds to overall latency/lag. Overcoming a lot of jitter might require buffers so large that the resulting lag would make a program unresponsive.

There is no timestamp in the TCP/IP header, therefore a performance variance, such as a jitter or a lag can be introduced by the originating migration server/image, for example, utilizing the netem command in Linux, such as: #tc qdisc add dev eth0 root netem delay 100 ms. In this example, netem consists of two portions: a small kernel module for a queuing discipline and a command line utility to configure it.

Figure 2:
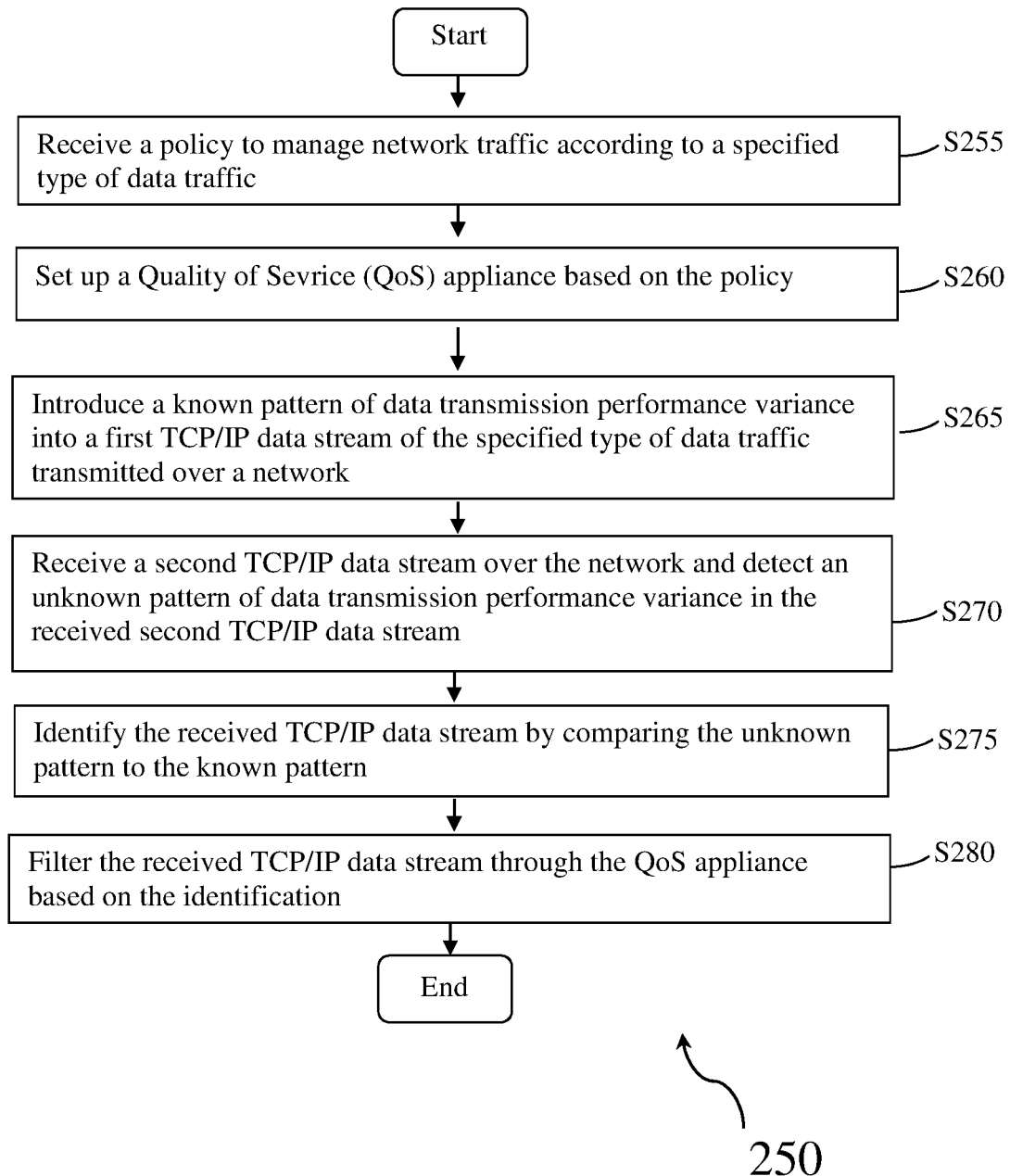
FIG. 2 is a flowchart depicting an embodiment of a method that may be performed, at least in part, by the system depicted in FIG. 1.
Figure 3:
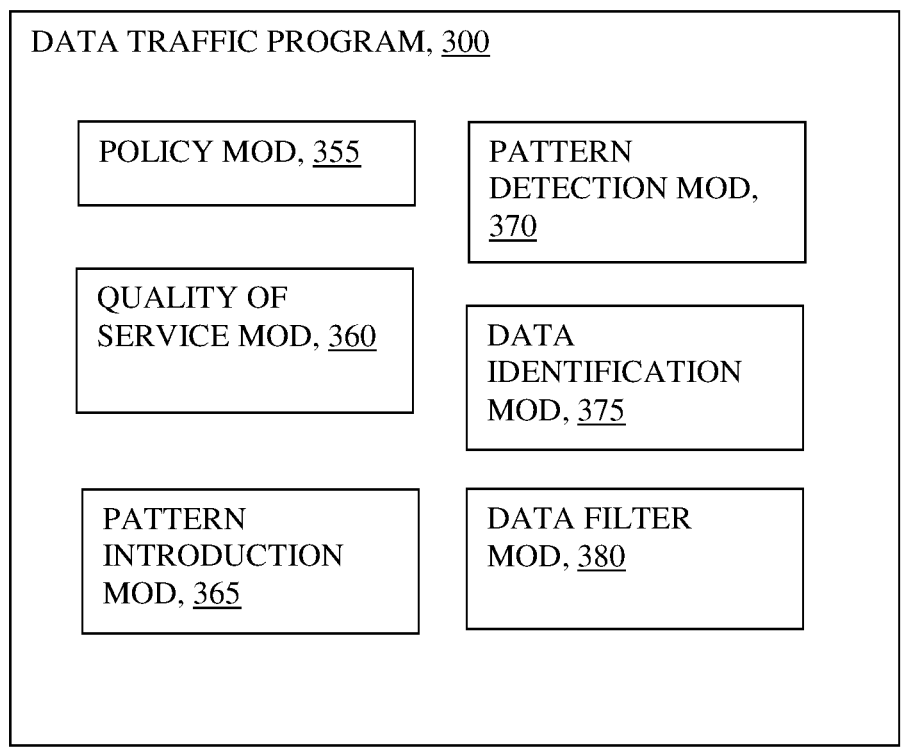
FIG. 3 is a schematic view of a machine logic (for example, software) portion of the system depicted in FIG. 1.

FIG. 2 shows flowchart 250 depicting a first method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where policy module ("mod") 355 receives a policy to manage network traffic according to a specified type of data traffic. In this example, the policy describes rules and regulations regarding how to manage network traffic associated with a specified type of data traffic, for example, audio data stream or video data stream that transmits through a network.

Processing proceeds to step S260, where Quality of Service (QoS) module 360 sets up a QoS appliance based on the policy. In this example, the QoS appliance (e.g., QoS computer 200) is configured to control network traffic through it according to the received policy.

Processing proceeds to step S265, where pattern introduction module ("mod") 365 introduces a known or specified pattern of data transmission performance variance (e.g., lag or jitter) into a TCP/IP data stream of a specified type of data traffic transmitted over a network. In this example, servers 104, 106,108, and 112 are migrating data over network 114. A specified or preferred lag or jitter pattern is defined and introduced into the TCP/IP data stream of migration data of those servers at the server's respective switches (not shown in FIG. 1). Thus migration data traffic are marked or associated with the preferred lag or jitter pattern. Further, the specified lag or jitter pattern is defined and stored in jitter and lag database 111 running on computer 110.

Further, with the migration data labeled with the specified lag or jitter pattern, a managed circuit transmitting the migration data over network 114 is established and marked with the specified lag or jitter pattern. Herein the managed circuit is an end-to-end path of a packet through a managed network of many managed hubs/switches, such that the circuit is able to be identified by identifying the pattern of the lag or jitter.

Alternatively, a lag or jitter pattern may be introduced in unmanaged network for the unique identification of a packet of data. In such case, it would require the ability to manipulate the data stream at some point in the path of data transmission, and then to know where to detect the data stream. For example, it could be used to trace a data stream of illegal file sharing, through the unique identification of a stream of data, even if the data is encrypted. The trace may be placed on one end, for example, a known or suspected file server, and then track the data stream through the various hops.

Processing proceeds to step S270, where pattern detection module 370 receives a TCP/IP data stream over the network and detect an unknown pattern of data transmission performance variance in the received TCP/IP data stream. In this example, quality of service sub-system 102 and/or computer 110 is responsible for regulating data traffic and receives the TCP/IP data stream. In this case, the TCP/IP data stream may be any data stream including the migration data stream from servers 104, 106, 108 and 112, other production workload/traffic, and music or video data stream. Herein the production traffic refers to legitimate customer data/network traffic, as oppose to other types of traffic such as web browsing, music and video, etc. As the TCP/IP data stream goes through the network 114 switch and router, a pattern of jitter and lag is detected and identified by the QoS sub-system 102 and/or computer 110.

Processing proceeds to step S275, where data identification module 375 determines whether or not the received TCP/IP data stream as being the TCP/IP data stream of the specified type of data traffic. In this example, the pattern detected in the received TCP/IP data stream is collected and matched or compared against the introduced jitter or lag pattern as stored in jitter and lag database 111. If the detected unknown pattern matches the specified or known pattern, the received TCP/IP data stream is identified as data migration traffic from servers 102, 106, 108, and/or 112. If the detected pattern does not matches the specified or known pattern, the received TCP/IP data stream is identified as data traffic other than the data migration traffic.

Processing proceeds to stop at step S280, where data filter module 380 filters the received TCP/IP data stream through QoS appliance based on the identification. In this example, the identification information in step S275 is communicated to the QoS device that will regulate the received TCP/IP data stream based on the identification information, for example, allowing throughput of the received TCP/IP data stream of data migration traffic, and blocking the received TCP/IP data stream other than data migration traffic such as media streaming traffic that otherwise looks similar to the data migration traffic.

The regulation of TCP/IP data stream by the QoS system may further based on corporate policies and other service rules that may be applied at any point along a circuit transmitting data traffic, even if the circuit changes based on, for example, failover, re-routing, etc.

With the introduction of a lag or jitter pattern into TCP/IP data stream, the data packet associated with the lag or jitter pattern is able to stand out compared to other traffic, leading the data packet to be unique and predictable for detection in the network. Thus, desired data traffic, such as data migration, can be regulated by the QoS system according to certain rules and/or policies by differentiating the desired data traffic based on the associated lag or jitter pattern. Some embodiments of the present invention may include one, or more, of the following features, characteristics and/or advantages: (i) a lag or jitter pattern is introduced into TCP/IP data stream to mark data traffic; (ii) migration/production traffic can be identified and allowed to transmit over a network when the QoS system is enabled; (iii) throughput traffic is more optimized; and/or (iv) data flows are able to be identified for troubleshooting reasons.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer implemented method (CIM) comprising:
   receiving an expected pattern data set including information indicative of a specified pattern of data transmission performance variance in a TCP/IP data stream, the specified pattern of the data transmission performance variance being associated with transmitting of data over the TCP/IP data stream;
   receiving a networking traffic data stream comprising a plurality of TCP/IP data streams including the TCP/IP data stream, where each TCP/IP data stream of the plurality of TCP/IP data streams has a corresponding pattern of data transmission performance variance;
   for each TCP/IP data stream, comparing the corresponding pattern of data transmission performance variance against the expected pattern data set;
   identifying a subset of one or more TCP/IP data stream(s) from within the networking traffic data stream based, at least in part, on the comparison of the corresponding patterns of data transmission performance variance of the TCP/IP data streams against the expected pattern data set; and
   filtering the subset of one or more TCP/IP data stream(s) to regulate the subset of the one or more TCP/IP data streams based on the identifying.

2. The CIM of claim 1, wherein each member of the subset has a corresponding pattern of data transmission performance variance that matches the expected pattern of data transmission performance variance data set.

3. The CIM of claim 1, wherein the performance variance is a lag.

4. The CIM of claim 1, wherein the performance variance is a variance in TCP/IP packet latency over time implemented through operating system commands.

5. The CIM of claim 1, wherein filtering the subset further comprises:
   allowing throughput of the subset of one or more TCP/IP data stream(s) through a network traffic gateway.

6. The CIM of claim 1, further comprising:
   blocking the subset of one or more TCP/IP data stream(s) from passing through a network traffic gateway.

7. The CIM of claim 1, wherein the pattern of data transmission performance variance is introduced to a TCP/IP data stream by modifying a sliding window size in a TCP/IP address header for the given networking data stream to trace the TCP/IP data stream through a plurality of managed network hubs.

8. The CIM of claim 1, wherein the pattern of data transmission performance variance is introduced to a TCP/IP data stream by adding a time delay to data packets being transmitted for the given networking data stream.

9. A computer program product (CPP) comprising:
   a machine readable storage device; and
   computer code stored on the machine readable storage device, with the computer code including instructions for causing a processor(s) set to perform operations including the following:
      receiving an expected pattern data set including information indicative of a specified pattern of data transmission performance variance in a networking traffic data stream, the specified pattern of the data transmission performance variance being associated with transmitting of a specified type of data over the networking traffic data stream,
      receiving the networking traffic data stream comprising a plurality of TCP/IP data streams, where each TCP/IP data stream has a corresponding pattern of data transmission performance variance,
      for each TCP/IP data stream, comparing the corresponding pattern of data transmission performance variance against the expected pattern data set,
      identifying a subset of one or more TCP/IP data stream(s) from within the networking traffic data stream based, at least in part, on the comparison of the corresponding patterns of data transmission performance variance of the TCP/IP data streams against the expected pattern data set, and
      filtering the subset of one or more TCP/IP data stream(s).

10. The CPP of claim 9, wherein each member of the subset has a corresponding pattern of data transmission performance variance that matches the expected pattern of data transmission performance variance data set, and the specified type includes a data migration.

11. The CPP of claim 9, wherein the performance variance is a lag.

12. The CPP of claim 9, wherein the performance variance is a variance in TCP/IP packet latency over time implemented through operating system commands.

13. The CPP of claim 9, wherein filtering the subset further comprises:
   allowing throughput of the subset of one or more TCP/IP data stream(s) through a network traffic gateway.

14. The CPP of claim 9, wherein the computer code further includes instructions for causing the processor(s) set to perform the following operations:
   blocking the subset of one or more TCP/IP data stream(s) from passing through a network traffic gateway.

15. A computer system (CS) comprising:
   a processor(s) set;
   a machine readable storage device; and
   computer code stored on the machine readable storage device, with the computer code including instructions for causing the processor(s) set to perform operations including the following:
      receiving an expected pattern data set including information indicative of a specified pattern of data transmission performance variance in a networking traffic data stream, the specified pattern of the data transmission performance variance being associated with transmitting of data over the networking traffic data stream,
      receiving the networking traffic data stream comprising a plurality of TCP/IP data streams, where each TCP/IP data stream has a corresponding pattern of data transmission performance variance,
      for each TCP/IP data stream, comparing the corresponding pattern of data transmission performance variance against the expected pattern data set,
      identifying a subset of one or more TCP/IP data stream(s) from within the networking traffic data stream based, at least in part, on the comparison of the corresponding patterns of data transmission performance variance of the TCP/IP data streams against the expected pattern data set, and
      filtering the subset of one or more TCP/IP data stream(s) to regulate the TCP/IP data streams based on the identifying.

16. The CS of claim 15, wherein each member of the subset has a corresponding pattern of data transmission performance variance that matches the expected pattern of data transmission performance variance data set.

17. The CS of claim 15, wherein the performance variance is a lag.

18. The CS of claim 15, wherein the performance variance is a variance in TCP/IP packet latency over time implemented through operating system commands.

19. The CS of claim 15, wherein filtering the subset further comprises:
   allowing throughput of the subset of one or more TCP/IP data stream(s) through a network traffic gateway.

20. The CS of claim 15, wherein the computer code further includes instructions for causing the processor(s) set to perform the following operations:
   blocking the subset of one or more TCP/IP data stream(s) from passing through a network traffic gateway.

* * * * *